United States Patent
Broomall et al.

(10) Patent No.: US 10,469,275 B1
(45) Date of Patent: Nov. 5, 2019

(54) CLUSTERING OF DISCUSSION GROUP PARTICIPANTS

(71) Applicant: Amazon Technologies, Inc., Seattle, WA (US)

(72) Inventors: Jamie Broomall, Seattle, WA (US); Alexandre Alexandrovich Klementiev, Berlin (DE); Amber Autrey Taylor, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 707 days.

(21) Appl. No.: 15/195,160

(22) Filed: Jun. 28, 2016

(51) Int. Cl.
| | |
|---|---|
| *H04L 12/18* | (2006.01) |
| *H04L 29/08* | (2006.01) |
| *H04L 12/58* | (2006.01) |
| *G06F 3/0484* | (2013.01) |
| *G06F 17/27* | (2006.01) |
| *G06N 5/04* | (2006.01) |
| *G06N 20/00* | (2019.01) |

(52) U.S. Cl.
CPC ...... *H04L 12/1822* (2013.01); *G06F 3/04842* (2013.01); *G06F 17/2705* (2013.01); *G06F 17/2785* (2013.01); *G06N 5/04* (2013.01); *G06N 20/00* (2019.01); *H04L 51/32* (2013.01); *H04L 67/22* (2013.01); *H04L 67/306* (2013.01)

(58) Field of Classification Search
CPC ..... H04L 12/1822; H04L 51/32; H04L 67/22; H04L 67/306; G06N 20/00; G06N 5/04; G06F 3/04842; G06F 17/2705; G06F 17/2785
See application file for complete search history.

(56) References Cited

U.S. PATENT DOCUMENTS

| | | |
|---|---|---|
| 8,060,463 B1 | 11/2011 | Speigel |
| 8,892,630 B1 | 11/2014 | Curtis |
| 2004/0098275 A1 | 5/2004 | Hubert |
| 2005/0216842 A1 | 9/2005 | Keohane et al. |
| 2007/0106656 A1 | 5/2007 | Gutta |
| 2008/0215424 A1 | 9/2008 | Guldimann et al. |
| 2008/0294999 A1 | 11/2008 | Bank et al. |
| 2009/0049127 A1 | 2/2009 | Juan et al. |
| 2009/0119108 A1 | 5/2009 | Noh et al. |
| 2009/0164910 A1 | 6/2009 | Laakso et al. |
| 2010/0306122 A1 | 12/2010 | Shaffer |
| 2011/0004501 A1 | 1/2011 | Pradhan et al. |
| 2011/0123967 A1 | 5/2011 | Perronnin et al. |

(Continued)

FOREIGN PATENT DOCUMENTS

WO    WO 2009/136411 A2    11/2009

*Primary Examiner* — Austin Hicks
(74) *Attorney, Agent, or Firm* — Knobbe, Martens, Olson & Bear, LLP

(57) ABSTRACT

Systems and methods are provided for spitting a population of users into electronic discussion groups or subgroups to facilitate more engaging conversations. Discussion profiles may be generated for individual users based on behavioral data, linguistic analysis, and demographic data. A target group size may be determined based on an analysis of user engagement levels within a number of discussion groups of varying sizes. One or more machine learning models may be configured to assign users to groups based on the users' similarity to each other and their conversation styles in order to maximize expected user engagement across the different groups.

20 Claims, 6 Drawing Sheets

(56) References Cited

U.S. PATENT DOCUMENTS

| | | |
|---|---|---|
| 2011/0179204 A1 | 7/2011 | Hulbert et al. |
| 2012/0246343 A1 | 9/2012 | Story et al. |
| 2012/0324392 A1 | 12/2012 | Mbenkum et al. |
| 2013/0015954 A1 | 1/2013 | Thorne et al. |
| 2013/0031090 A1 | 1/2013 | Posse |
| 2013/0132865 A1 | 5/2013 | Li |
| 2015/0012419 A1* | 1/2015 | Lawler .................. G06Q 10/10 705/39 |
| 2017/0147946 A1* | 5/2017 | Umeda .................. G06N 5/046 |

* cited by examiner

CLUSTERING OF DISCUSSION GROUP PARTICIPANTS

BACKGROUND

Retailers and merchants involved in electronic commerce continually strive to make it easier for customers to research products and receive information that may assist in purchasing decisions. One way to improve a customer's experience includes providing discussion groups (which may be in the form of discussion boards, forums or other group messaging platforms) that allow customers to exchange information with other people via dialogue in a discussion. In the retail context, ever-enlarging product catalogs make discussion forums helpful when a customer tries to distinguish between products, seek out impartial advice, learn more about a product or category, or obtain other information. A merchant with a large catalog of products may offer a large number of different discussion groups on a variety of topics, which may range from very specific topics to general ones. Outside of the retail context, discussion groups may be available with a topic or focus on a shared interest, hobby, specific content (such as a discussion group based around a video or book), current events, and/or other subject area. Some discussion groups available through a given content provider may be more active and have a greater frequency of messages than others, which may depend on a number of factors.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
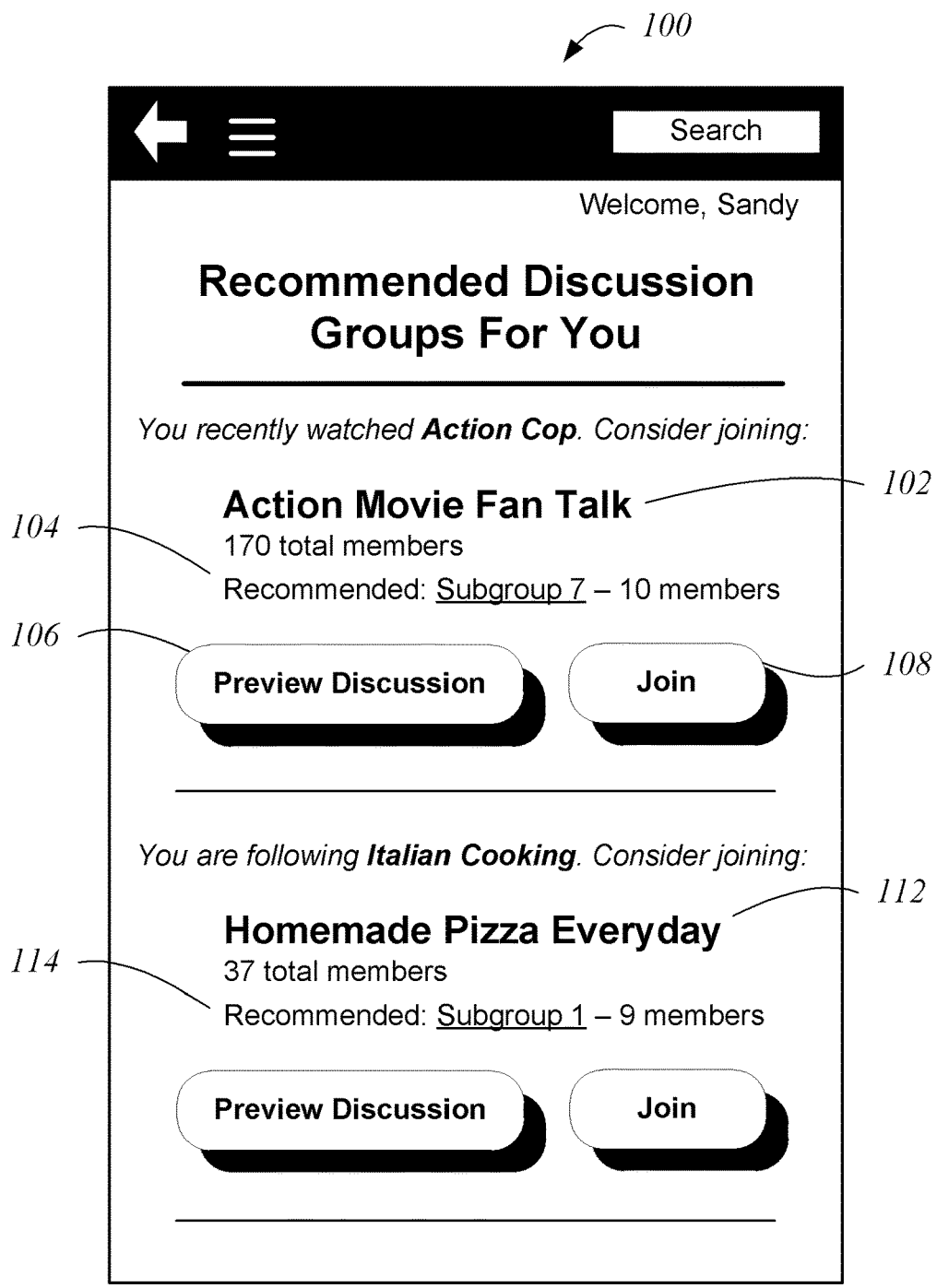
FIG. 1 is a pictorial diagram depicting an example user interface representation illustrating discussion group recommendations for a user.

Generally described, aspects of the present disclosure relate to assigning or recommending discussion groups to users in order to facilitate engaging discussion among members of each discussion group. For example, it some situations, users may be more likely to engage in conversation in a smaller group of users than in a larger group. Accordingly, aspects of the present disclosure relate to splitting a larger population of potential group members into multiple smaller groups or subgroups in order to attempt to maximize user engagement across the full population of users. As will be described further below, the propensity of a given group of users to have an ongoing and engaging discussion may be projected by machine learning techniques based on various user data and message analysis performed on existing discussion group data.

As an illustrative example according to one embodiment, if a large number of users are interested in discussing a given topic, a discussion service disclosed herein may split or cluster the users into groups that each include around ten people, with the groups being determined based on the users' similarity to each other and/or their conversation styles in order to maximize user engagement across the different groups. The target size of ten users for each group may be determined based on an analysis of engagement levels within each of a potentially large number of different discussions groups of varying sizes, which may result in the given example in a determination that a group size of ten users has the highest average number of messages per user and/or other metric that the discussion service is configured to maximize in a given embodiment. The discussion service may determine how to cluster or group the users based on user interests, demographic data, purchase history, browsing history, writing style, vocabulary, propensity to include images or other media in messages, and/or other factors.

In one embodiment, a discussion service may determine behavioral data associated with each user to be assigned to a discussion group. The behavioral data may be determined based at least in part on retrieved user browsing history and/or user purchase history stored in association with each user's account with a retail service or other service. The discussion service may also retrieve content previously submitted by the users in prior comments, messages, reviews or other forms of user submissions. The discussion service may then generate a discussion profile for each of the users based at least in part on the behavioral data and an analysis of the textual content in the users' previous messages. The users may be assigned to different discussion groups based at least in part on an expected average user engagement level determined by the discussion service based on this various data.

In some embodiments, an electronic discussion group or discussion forum (sometimes referred to herein as simply a "group") is a discussion group hosted by a server where users, utilizing computing devices in network communication with the server, may exchange messages (such as text-based messages) via posts or entries, typically continued in a dialogue format. In some instances, the discussion group may facilitate exchanging and viewing images (e.g., videos, icons, or other graphical imagery) or exchanging and/or playing audio and/or video clips. Users may either contribute to the discussion or they may read other users' entries to gain insight on the discussion topic. The discussion within a group may be synchronous or asynchronous, depending on the embodiment. For example, in some embodiments, the users may have a conversation in real time, while in other embodiments there may be minutes or hours between messages.

While reference is made below to both groups and subgroups, it will be appreciated that a subgroup of a discussion group may still be considered a discussion group itself, as "discussion group" is intended to be used broadly herein. In some embodiments, the discussion groups may be surfaced or presented via pages or user interfaces associated with an electronic catalog. For illustrative purposes, discussion groups are often described below in the context of an item catalog offered by a retailer. However, it should be appreciated that the described systems and methods may be implemented in other contexts in which discussion groups are offered. For example, discussion groups could be offered within an environment or system without any retail component, such as a social networking service, an educational environment, a support group, a local community group, within a corporation, etc.

According to some aspects of the present disclosure, grouping users into discussion groups may include applying aspects of known clustering techniques. However, as will be appreciated by one of ordinary skill in the art, standard cluster analysis and known clustering techniques typically aim to group objects in a manner whereby objects in the same group or cluster are more similar to each other than to objects placed into other groups or clusters. In contrast, one objective according to some embodiments of the present disclosure is to maximize user engagement or other discussion-related metric within each discussion group that is formed based on the user groupings determined. In some such embodiments, machine learning techniques may be applied that are capable of recognizing through an iterative learning process that similarity of users within a cluster does not result in maximum user engagement within the resulting groups. For instance, the average engagement level per user may be higher when there are some contrasting views and/or different conversation tendencies among members of an individual discussion group than when all group members are very similar. Accordingly, typical clustering techniques may not be well-suited to such embodiments on their own, but may be used in combination with other methods described herein.

FIG. 1 is a pictorial diagram depicting an illustrative user interface 100 that includes presentation of discussion group recommendations for a user. The user interface 100 may be displayed, for example, via a browser or other application operating upon a client computing device utilized by a user. As illustrated, the user interface 100 includes two recommended discussion groups 102 (identified as "Action Movie Fan Talk") and 112 (identified as "Homemade Pizza Everyday"). An Action Movie Fan Talk discussion group 112 may have been identified as being of potential interest to the user based on the user's viewing history, which may indicate that the user watched an action movie recently.

As illustrated, the discussion group 112 has multiple subgroups, with recommendation 104 indicating that the discussion service has recommended that the user join "Subgroup 7" of Action Movie Fan Talk. The discussion service may have selected the specific subgroup for the user based on a determination that the user is similar to other users of this subgroup, a determination that the addition of this user would add to the engagement level of the subgroup based on the user's messaging tendencies, and/or other factors described further below. Similarly, as illustrated by recommendation 114, the discussion service has recommended that the user join "Subgroup 1" of the Homemade Pizza Everyday discussion group 112. While the subgroup identifiers are displayed in user interface 100, in other embodiments, the user may not be aware that different related subgroups exist. The user interface further includes a selectable option 106 that enables the user to preview the discussion in "Subgroup 7" of discussion group 102, and a selectable option 108 that the user may select to join "Subgroup 7" of discussion group 102.

While the user interface illustrated in FIG. 1 is focused on presenting recommendations of discussion groups for a user, it will be appreciated that options to join a discussion group may be provided within a wide variety of different user interfaces or pages associated with a retail service or other service. For example, in one embodiment, a page or user interface that presents item information regarding an item available for purchase (such as a specific movie) may include an option that a user may select in order to join a discussion group associated with that item, a discussion group associated with that category of item (or genre of movie, for example), and/or other recommended discussion group based at least in part on the given item. As another example, a user viewing a page associated with a given interest or topic (such as hiking) may be presented with an option to join a discussion group associated with that topic (such as a discussion group including other hiking enthusiasts in the same geographic region as the user). The specific group or sub-group that the user may be invited to join in either example may be selected for the user based on aspects of the present disclosure described further below.

Figure 2:
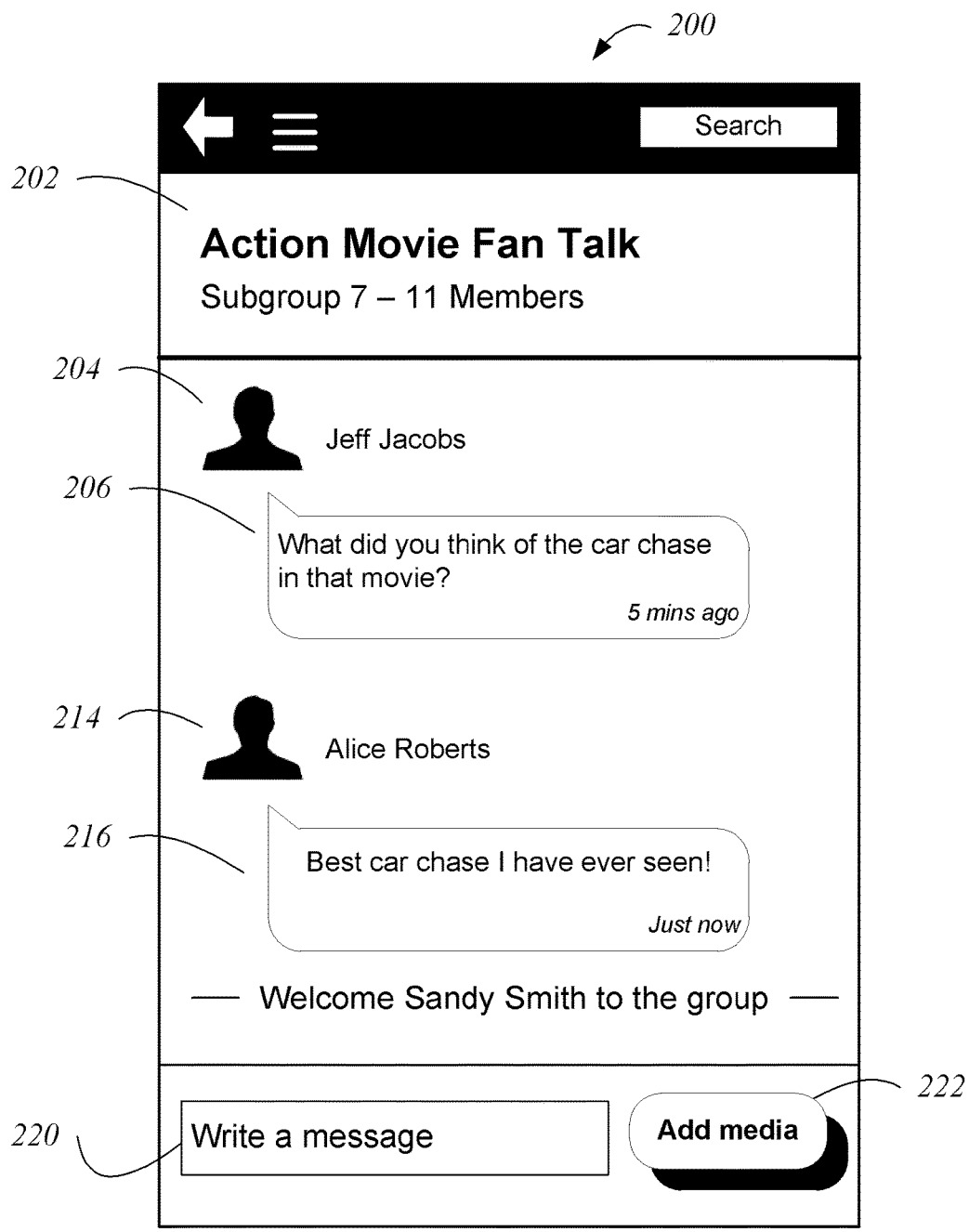
FIG. 2 is a pictorial diagram depicting an example user interface representation illustrating messages exchanged among users in a discussion group, and an option for a user to post a message to the discussion group.

FIG. 2 is a pictorial diagram depicting an example user interface 200 illustrating messages 206 and 216 exchanged among users in a discussion group, and an option 220 for a user to submit or post a message to the discussion group. User interface 200 may be presented, for example, in response to a user selecting to join "Subgroup 7" of the Action Movie Fan Talk discussion group 202. For example, the user may have selected option 108 described above with reference to FIG. 1. As illustrated, discussion group member 204 has recently posted a message 206, to which discussion group member 214 just responded to within message 216. The user to which user interface 200 is displayed may post her own message by typing text in field 220, and may add media (such as a photo, video, or audio clip) to her message via selectable option 222. In other embodiments, the user may use a camera or microphone to participate in audio and/or video discussion. It will be appreciated that the discussion format in user interface 200 is only one illustrative example according to one embodiment. In other embodiments, a variety of discussion presentation types may be provided, as is known in the art. For example, the discussion format may be different based on whether the discussion group content is accessed from a mobile device or a desktop computer.

Figure 3:
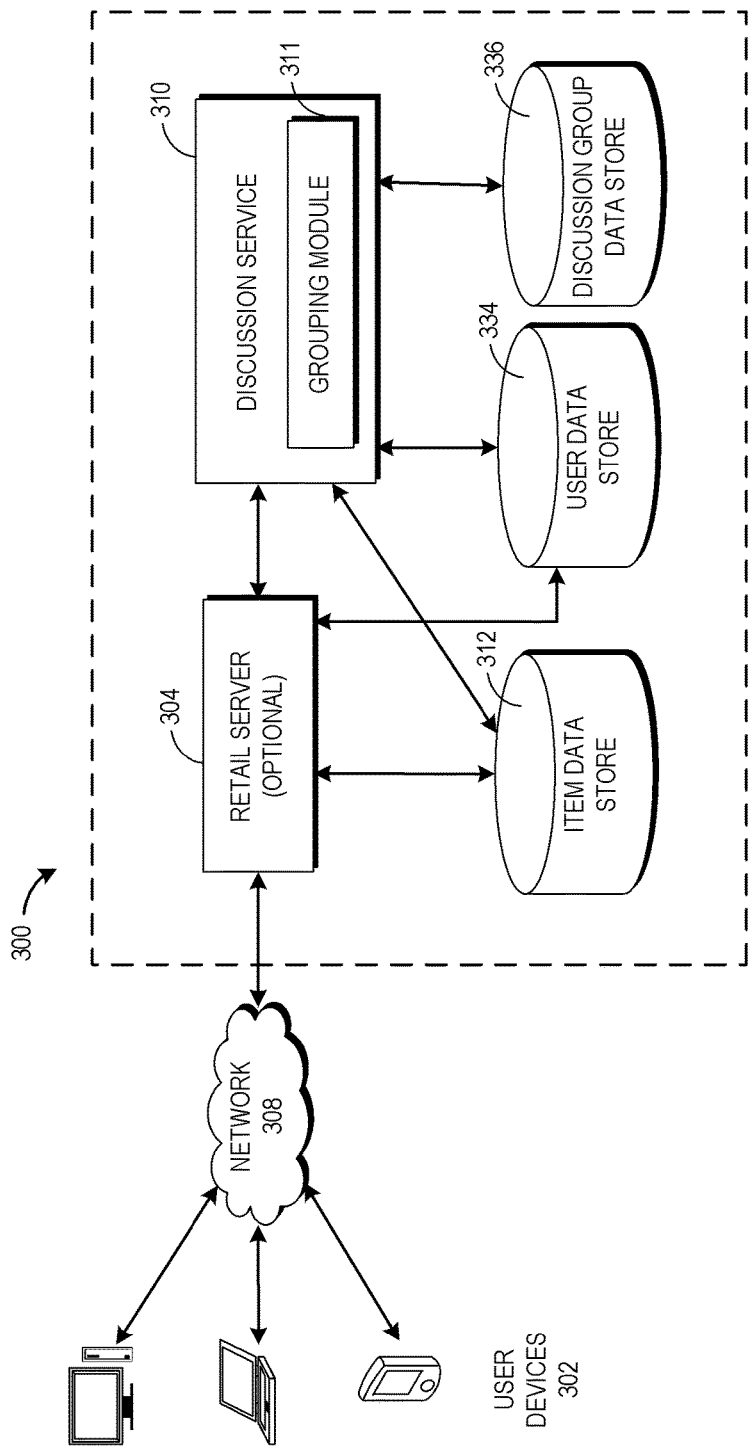
FIG. 3 is a block diagram depicting an illustrative operating environment for creating discussion groups and assigning users to discussion groups based on multi-dimensional user profile analysis.

FIG. 3 is a block diagram depicting an illustrative operating environment 300 for creating discussion groups and assigning users to discussion groups based on a multi-dimensional user profile analysis. The illustrative operating environment shown in FIG. 3 includes an electronic catalog system 300 that enables users to browse items (such as items listed in an electronic catalog for purchase). The catalog system 300 may include a discussion service 310, as well as an associated grouping module 311 and discussion group data store 336, which may be used to implement various aspects of the present disclosure, such as determining which groups to recommend to specific users. The discussion group data store 336 may include information regarding a number of discussion groups, with stored information for each group including identification of the group's members, a size (e.g., the total number of users belonging to the group), the content of the discussion group (including user-submitted messages posted to the discussion group), and/or other information. The catalog system 300 may also include one or more optional retail servers 304 that facilitate electronic browsing and purchasing of items using various user devices, such as user computing devices 302 (which may alternatively be referred to herein as client computing devices). User computing devices 302 may be any of a number of computing devices that are capable of communicating over a network including, but not limited to, a laptop, personal computer, personal digital assistant (PDA), hybrid PDA/mobile phone, mobile phone, smartphone, electronic book reader, digital media player, tablet computer, gaming console or controller, kiosk, augmented reality device, other wireless device, set-top or other television box, and the like.

Retail server 304 may be connected to and/or in communication with an item data store 312 that stores item information regarding a number of items, such as items listed in an electronic catalog as available for browsing and/or purchasing via the retail server 304. Item data stored in item data store 312 may include any information related to each item. For example, item data may include, but is not limited to, price, availability, title, item identifier, item images, item description, item attributes, item text, item reviews, etc. The item data store 312 may additionally store digital content items (e.g., audiobooks, electronic books, music, movies, multimedia works, etc.). The retail server 304 may also be connected to or in communication with user data store 334, which may store user data associated with users of retail server 304. The stored user data may include account information, purchase history, browsing history, item reviews and ratings, personal information, location information, billing information, messages exchanged with other users, messages posted to discussion groups, etc.

In some embodiments, each of the item data store 312, user data store 334 and/or discussion group data store 336 may be local to retail server 304, may be remote from both discussion service 310 and retail server 304, and/or may be a network-based service itself. The illustrated data stores may be embodied in hard disk drives, solid state memories, any other type of non-transitory computer-readable storage medium, and/or a file, a database, a relational database, in-memory cache, and/or stored in any such non-transitory computer-readable medium accessible to the retail server 304 and/or discussion service 310. The data stores may also be distributed or partitioned across multiple local and/or storage devices, or combined into a single storage device, without departing from the spirit and scope of the present disclosure.

In the environment shown in FIG. 3, a user of the catalog system 300 may utilize a user computing device 302 to communicate with the retail server 304 via a communication network 308, such as the Internet or other communications link. The network 308 may be any wired network, wireless network or combination thereof. In addition, the network 308 may be a personal area network, local area network, wide area network, cable network, satellite network, cellular telephone network, etc. or combination thereof. For example, the network 308 may be a publicly accessible network of linked networks, possibly operated by various distinct parties, such as the Internet. In some embodiments, the network 308 may be a private or semi-private network, such as a corporate or university intranet. The network 308 may include one or more wireless networks, such as a Global System for Mobile Communications (GSM) network, a Code Division Multiple Access (CDMA) network, a Long Term Evolution (LTE) network, or some other type of wireless network. The network 308 may use protocols and components for communicating via the Internet or any of the other aforementioned types of networks.

The catalog system 300 is depicted in FIG. 3 as operating in a distributed computing environment including several computer systems that are interconnected using one or more computer networks. The catalog system 300 could also operate within a computing environment having a fewer or greater number of devices than are illustrated in FIG. 3. Thus, the depiction of catalog system 300 in FIG. 3 should be taken as illustrative and not limiting to the present disclosure. For example, the catalog system 300 could implement various Web services components and/or peer-to-peer network configurations to implement at least a portion of the processes described herein.

In brief, the retail server 304 is generally responsible for providing front-end communication with various user devices, such as a user computing device 302, via network 308. The front-end communication provided by the retail server 304 may include generating text and/or graphics, possibly organized as a user interface using hypertext transfer or other protocols in response to information inquiries received from the various user devices. The retail server 304 may obtain information on available items from one or more data stores, such as item data store 312, as is done in conventional electronic commerce systems. In certain embodiments, the retail server 304 may also access item data from other data sources, either internal or external to catalog system 300. In some embodiments other than that illustrated in FIG. 3, the retail server 304 may include or implement a discussion service, as described herein, such that a separate discussion service 310 may not be present in certain embodiments. As noted above, many aspects of the present disclosure related to discussion groups are applicable outside of the retail context, and the electronic catalog environment is used herein only for illustrative purposes.

Figure 4:
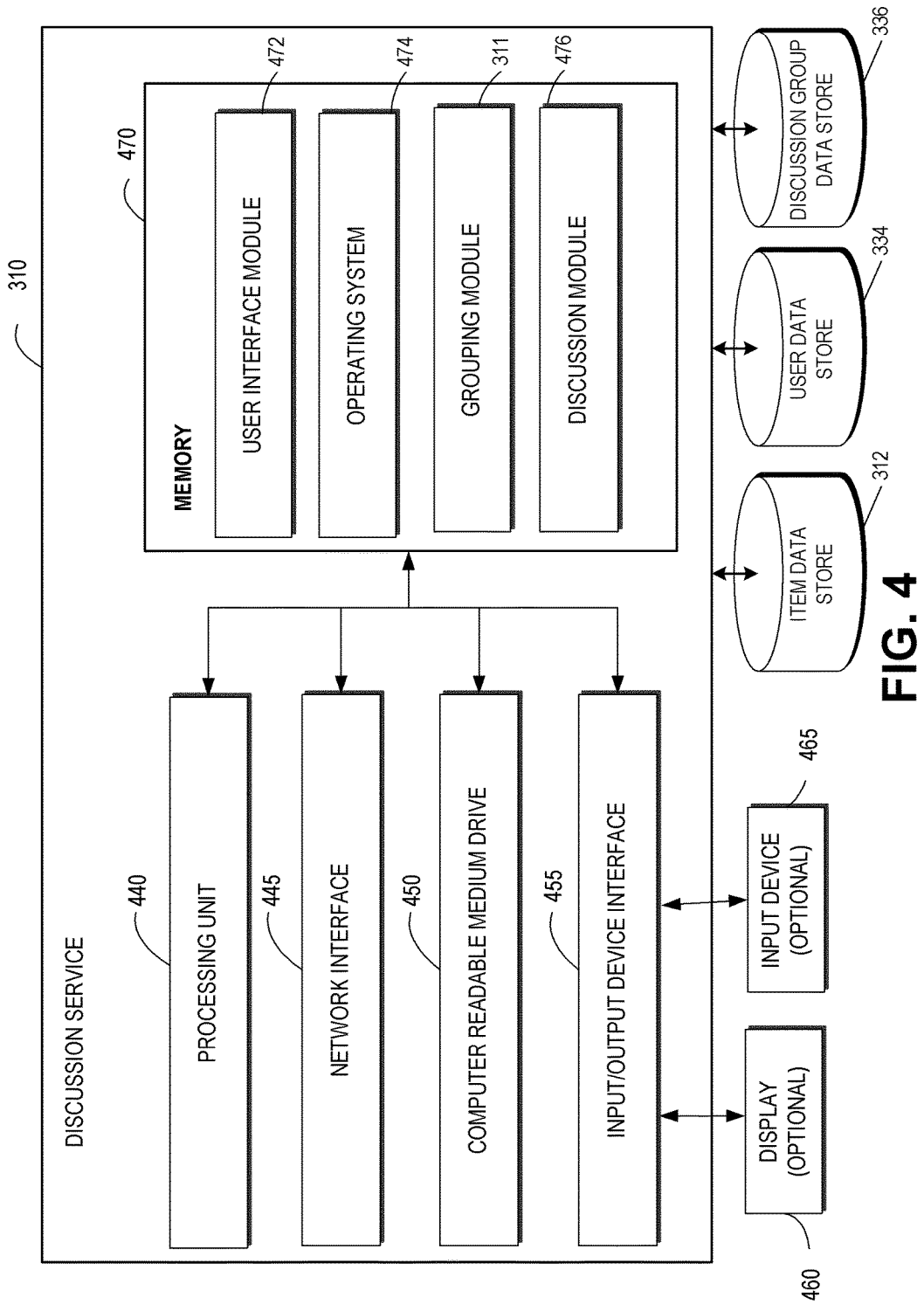
FIG. 4 depicts a general architecture of an example computing device providing a discussion service.

FIG. 4 depicts a general architecture of a computing system (referenced as discussion service 310) configured to implement various aspects of the present disclosure. The general architecture of the discussion service 310 depicted in FIG. 4 includes an arrangement of computer hardware and software components. The discussion service 310 may include many more (or fewer) elements than those shown in FIG. 4. It is not necessary, however, that all of these generally conventional elements be shown in order to provide an enabling disclosure. As illustrated, the discussion service 310 includes a processing unit 440, a network interface 445, a computer readable medium drive 450, an input/output device interface 455, a display 460, and an input device 465, all of which may communicate with one another by way of a communication bus. The network interface 445 may provide connectivity to one or more networks or computing systems. The processing unit 440 may thus receive information and instructions from other computing systems or services via the network 308. The processing unit 440 may also communicate to and from memory 470 and further provide output information for an optional display 460 via the input/output device interface 455. The input/output device interface 455 may also accept input from the optional input device 465, such as a keyboard, mouse, digital pen, microphone, touch screen, gesture recognition system, voice recognition system, gamepad, accelerometer, gyroscope, or other input device.

The memory 470 may contain computer program instructions (grouped as modules or components in some embodiments) that the processing unit 440 executes in order to implement one or more embodiments. The memory 470 generally includes RAM, ROM and/or other persistent, auxiliary or non-transitory computer-readable media. The memory 470 may store an operating system 474 that provides computer program instructions for use by the processing unit 440 in the general administration and operation of the discussion service 310. The memory 470 may further include computer program instructions and other information for implementing aspects of the present disclosure. For example, in one embodiment, the memory 470 includes a user interface module 472 that generates user interfaces (and/or instructions therefor) for display upon a computing device, e.g., via a navigation interface such as a browser or application installed on the computing device. In addition, memory 470 may include or communicate with discussion group data store 336, user data store 334, item data store 312, and/or one or more other data stores, as discussed above with reference to FIG. 3.

Grouping module 311 may analyze user information to assign or recommend users to specific discussion groups or subgroups based on various factors, as described herein. Discussion module 476 may be responsible for maintaining discussion groups and enabling members of the groups to electronically communicate within the discussion groups using known techniques. While grouping module 311 and discussion module 476 are shown in FIG. 4 as part of the discussion service 310, in other embodiments, all or a portion of the grouping module 311 and/or discussion module 476 may be implemented by the retail server 304 and/or another computing device. In some embodiments, the retail server 304 may include several components that operate similarly to the components illustrated as part of the discussion service 310, including a user interface module, grouping module, discussion module, processing unit, computer readable medium drive, etc. In some such embodiments, a separate discussion service 310 may not be needed.

Figure 5:
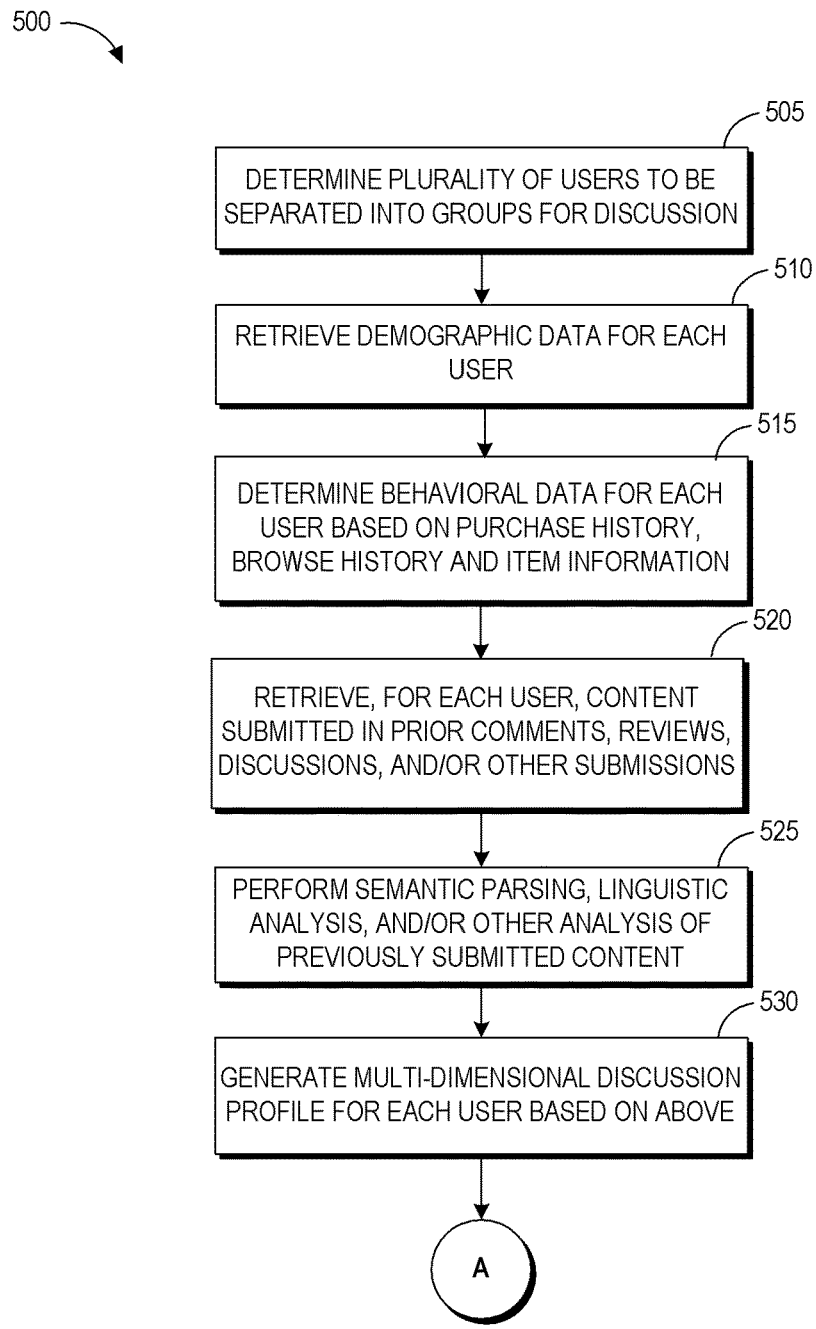
FIG. 5 is a flow diagram depicting an illustrative method for generating multi-dimensional discussion profiles for users in order to assign users to discussion groups.

FIG. 5 is a flow diagram depicting an illustrative method 500 implemented by the discussion service 310 for generating discussion profiles for users in order to assign users to discussion groups. While method 500 is described with reference to an embodiment in which a number of users are split into groups, a similar method may be implemented by the discussion service 310 in order to select an existing discussion group or subgroup for a single new member to join. In other embodiments, a similar method may be implemented periodically in order to either split or join groups or subgroups as a way of rebalancing or re-clustering discussion groups in order to improve expected user engagement across the groups as a whole. For example, as users join or leave groups, the group sizes may change and may benefit from occasional splitting or joining of groups.

The illustrative method begins at block 505, where the discussion service 310 determines the users that are to be separated into two or more discussion groups. As one example, the users may already belong to a discussion group that is larger than optimal (such as larger than a target group size) and that the discussion service 310 has determined should be split into subgroups. For example, the discussion service may have determined a target group size by analyzing response latency within groups of varying sizes, where determining response latency within an individual discussion group may include identifying that one message within the individual discussion group is responsive to an earlier message within the individual discussion group based on an analysis of content of the first message and content of the second message. The discussion service may aim, in some embodiments, to minimize response latency. As another example, the users may be selected based on a determination that the users are interested in a particular topic, where there are either a large number of users interested in discussing that topic or multiple existing discussion groups associated with that topic.

At block 510, the discussion service 310 retrieves demographic data for each of the users. The demographic data may be retrieved, for example, from user data store 334. The user demographic data for each user may include the user's age, geographic location, gender, and/or other information. The discussion service 310 then determines behavioral data for each user at block 515. In order to determine the behavioral data, the discussion service 310 may retrieve each user's purchase history and/or browse history from user data store 334. The discussion service 310 may also retrieve item data associated with each user's browsed and purchased items from item data store 312 in order to determine attributes of items that the user has shown interest in, identify similar items to those items, etc. The discussion service 310 may then analyze the retrieved information for each user to determine, for example, the types of items that the user has shown interest in (either by the user viewing information regarding the item or purchasing the item), how often the user has accessed certain pages or user interfaces, the user's activity level with respect to submitting written content (such as item reviews, messages in discussions groups, comments regarding media, and/or other content), the user's social network connections, the user's shipping history, and/or other information. In some embodiments, the behavioral data may be based in part on device data received from a client computing device utilized by a given user. For example, an application operating on the client device may provide information to the discussion service regarding how fast a user typed, how hard the user pressed when providing touchscreen input (which may indicate anger or frustration), and/or other gathered data.

Next, at block 520, the discussion service 310 retrieves, for each user, content that was previously submitted by the user in prior comments, reviews, discussion group messages, and/or other submissions. For example, item reviews may be retrieved from user data store 334 and/or item data store 312, while discussion group messages may be retrieved from discussion group data store 336. The retrieved content may include textual content (such as a narrative review of an item, or the text content of a message posted to a discussion group), audio content and/or visual content (such as a video or image). The discussion service 310 may then analyze the previously submitted content of each user at block 525 in order to determine writing style, language tendencies, vocabulary levels, word choice preferences, and/or other information. For example, the discussion service 310 may perform semantic parsing, linguistic analysis, metadata parsing, and/or use a semantic index, any or all of which may be performed according to methods known in the art.

At block 530, the discussion service 310 generates a multi-dimensional discussion profile for each user based on the demographic data, behavioral data and/or semantic analysis. The discussion profile for each user may store the results of the above analysis in a manner whereby, in some embodiments, the profile is capable of being interpreted as input data to a machine learning model. Accordingly, the data may be stored using different data structures depending on the type of data. For example, the discussion service 310 may define a number of enumerated data types, such as data types capable of representing concepts such as language style or word choice tendencies, using a set of possible predetermined values or labels that have been associated with certain behaviors observed by the discussion service. A given user's generated discussion profile may include, for example, data representing the user's demographic information, vocabulary fingerprint, discussion style, propensity to use slang, propensity to include images or other media in messages, average message length, average number of messages posted per day, identification of interests or hobbies, identification of items or types of items of interest to the user, sentiment or mood determinations (e.g., whether the user is likely to complain or use negative words in reviews or messages), and/or other information. The generated discussion profiles may be stored in discussion group data store 336 and/or user data store 334 for subsequent use by the discussion service in recommending discussion groups.

Figure 6:
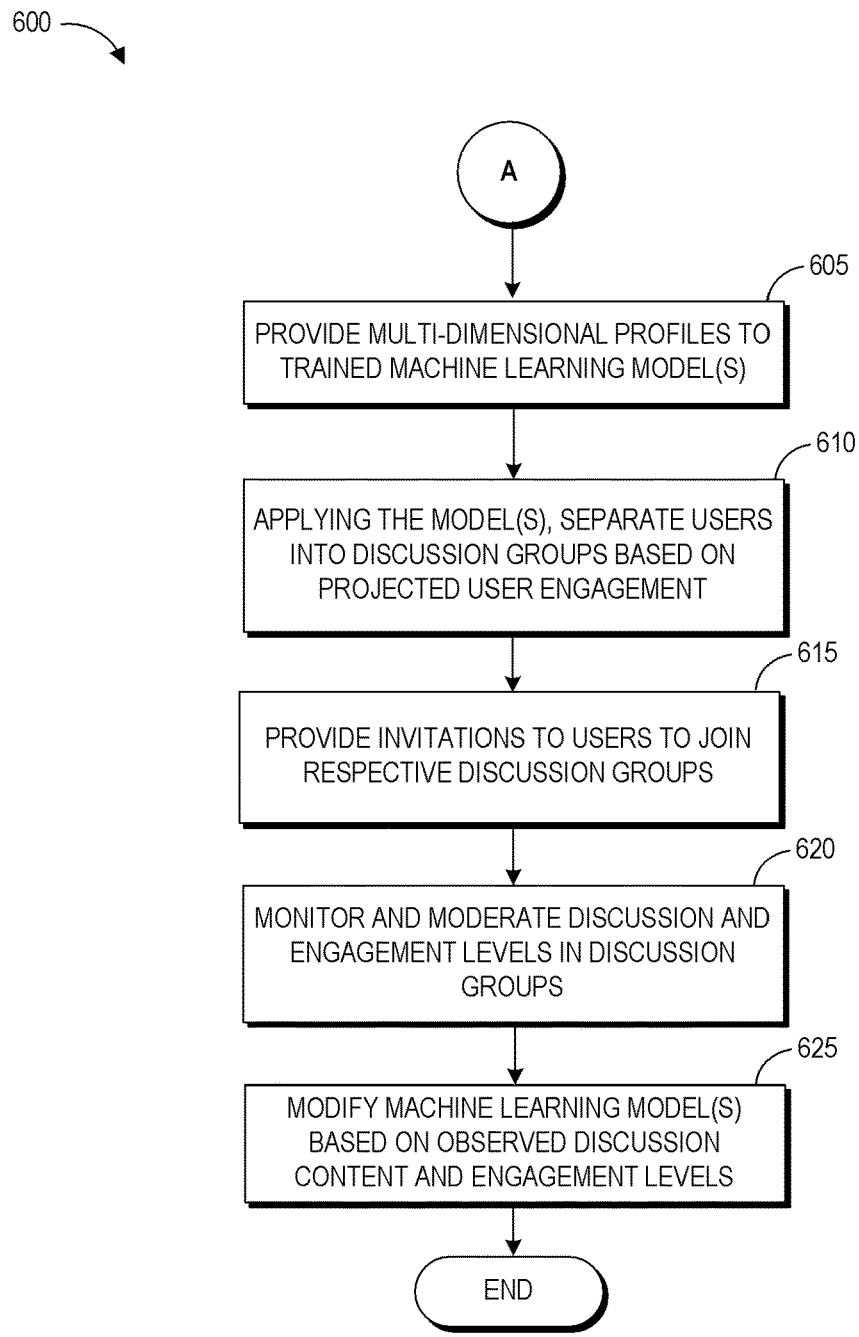
FIG. 6 is a flow diagram depicting an illustrative method for separating users into discussion groups using one or more machine learning models.

FIG. 6 is a flow diagram depicting an illustrative method 600 implemented by the discussion service 310, such as by the grouping module 311, for separating users into discussion groups using one or more machine learning models. Illustrative method 600 may be performed subsequent to method 500 described above. The illustrative method 600 begins at block 605, where the discussion service 310 provides the discussion profiles that were determined at block 530 of method 500 to one or more machine learning models as input data.

Depending on the embodiment, the machine learning model(s) may include models based on supervised or unsupervised learning approaches. In the supervised model context, the model may have been previously trained based on existing discussion group data and user profiles from which the model determined the user profile similarities, differences, or associations between users in a group that correlate with the group being successful. A successful group may be defined by one or more different metrics, depending on the embodiment. For example, the machine learning model(s) may be configured to assign a population of users to subgroups in order to maximize average user engagement, as further described herein. In some embodiments, the machine learning model(s) may employ various known techniques or model types, including but not limited multinomial logistic regression, an artificial neural network, supervised learning, unsupervised learning, reinforcement learning, and/or clustering algorithms.

At block 610, the discussion service 310 applies the machine learning model(s) to separate or assign the users to different groups or subgroups. In some embodiments, the groups may have previously existed (such as when dividing a large existing group into subgroups). In other embodiments, the discussion service 310 may be creating the groups as recommendations for users to join based on user interests. The result of implementing block 610 may be that each of the users is assigned to one group or subgroup, with the group sizes being relatively consistent with one another. For example, as discussed above, the discussion service 310 may have previously established a target group size. In some embodiments, the discussion service 310 may ensure that the groups created or modified at block 610 each have a group size that is within a certain threshold range of the a target group size. For example, if the target group size is determined to be twelve users in a given embodiment, the discussion service 310 may create enough groups that there are between eight and twelve users assigned to any given group. In other embodiments, the sizes of the groups may vary more widely from each other in order to maximize projected user engagement, and the discussion service 310 may not establish a predetermined target size across all groups. For example, the discussion service 310 may determine that some of the users are more likely to engage in discussion within a smaller group, while other users are more likely to engage in discussion within a larger group.

The discussion service 310 may determine which users to assign to which groups based on an analysis of the discussion profiles of each user. The machine learning model(s) may be configured to identify correlations between certain user combinations and engaging discussion within a group. For example, the discussion service 310 may have determined, based on an analysis of prior discussion groups' messages and members' discussion profiles, that users on average are more engaged in discussion groups in which 70-80% of the group members have similar discussion tendencies and opinions, but the remaining members hold contrarian views and/or have different discussion styles than the majority. In another embodiment or even in another subset of the general user population, discussion groups in which all of the members are very similar to one another may be preferable. In some embodiments, the discussion service 310 may consider various contexts differently when determining how to assign users to groups. For example, it may be determined that discussion groups focused on self-help topics (such as weight loss) include more engaged users when all members of a given group are similar to each other, while discussion groups focused on news topics (such as political topics) include more engaged users when there is more variety to the discussion profiles of members within a given group.

In some embodiments, certain individual users may be identified as having a strong correlation with an engaging discussion group (such as a user who posts messages very frequently and for whom many users have provided positive feedback in the form of messages, "following" the user, voting the user's comments as helpful or insightful, etc.). The discussion service 310, in some embodiments, may be configured to spread out the users that have the strongest individual impact into different groups or subgroups. In this manner, the average user engagement within each subgroup is more likely to be consistent, as opposed to maximizing engagement in one group at the expense of other groups.

As previously discussed, the discussion service 310 may be configured to estimate the expected user engagement levels of various potential groupings or clusters of users. The discussion service 310 may also train or modify its machine learning models based on observed engagement levels in existing discussion groups. Engagement levels may be determined or predicted based on, for example, response latency (such as how quickly users in a discussion group respond to other users' messages), and/or the total number of messages averaged per user over a given time frame (such as per hour or per day). In some embodiments, the discussion service 310 may employ a median or weighted average of the number of messages in a discussion group based on specific users in order to avoid a single user who frequently posts messages skewing the averages per user too greatly.

Once the discussion service 310 has determined the clusters or groupings of users, the method 600 proceeds to block 615, where the discussion service 310 may provide electronic invitations to users to join their respective group or subgroup, as determined by the discussion service. In some embodiments, the invitation may be in the form of an email, text message, message within an account of the retail server 304, or push notification to a mobile device. In other embodiments, the user may be offered to join his recommended discussion group the next time he accesses a given page or user interface associated with the electronic catalog system 300 (such as the illustrative user interface 100 shown in FIG. 1). In other embodiments, discussion group recommendations may be provided in response to a user-submitted search, where discussion groups identified in the search results may be sorted or ranked by the discussion service 310 based on how strongly the machine learning model predicts the user would be engaged in each discussion group.

Once the discussion groups have been formed and users have interacted within the discussion groups by posting messages, the discussion service 310 may monitor the messages, user activity and engagement levels within the discussion groups at block 620. For example, the discussion service 310 may track various metrics for each discussion group, such as average number of messages posted per hour, percentage of active users (such as those users averaging at least one message per day), member turnover, message sentiment, and/or other data. Additionally, the discussion service 310 may include a moderating model that the discussion service 310 implements in order to moderate the content within the discussion groups. For example, the moderation may include editing content of a user-submitted message to remove offensive language, or flagging or blocking a user account based on inappropriate messages. The quality and/or appropriateness of a user's messages may then be considered by the discussion service when determining whether to recommend a discussion group to that user in the future. The discussion service 310 may periodically modify, at block 625, the machine learning model(s) based on the above metrics and/or other considerations discussed herein in order to better determine projected engagement levels of users in the future.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
an electronic data store; and
a hardware processor in communication with the electronic data store, the hardware processor configured to execute computer-executable instructions to at least:
identify a plurality of users as potential members of a discussion group associated with a topic;
determine that the plurality of users includes a greater number of users than a predefined target group size;
determine behavioral data associated with individual users of the plurality of users, wherein the behavioral data is determined based at least in part on user browsing history and user purchase history;
retrieve content previously submitted by individual users of the plurality of users, wherein the previously submitted content includes content submitted in at least one of a prior comment, message or review;
analyze the content previously submitted by the individual users, wherein the content is analyzed using at least one of semantic parsing or linguistic analysis of text;
generate discussion profiles for the individual users based at least in part on the behavioral data and the content previously submitted;
assign each of the plurality of users to one of a plurality of discussion groups associated with the topic based at least in part by providing the discussion profiles to a machine learning model, wherein the machine learning model is configured to assign users to discussion groups based on the predefined target group size and an expected average user engagement level determined for each of the plurality of discussion groups;
provide a first electronic invitation to a first user to join a first discussion group associated with the topic, wherein the first user was assigned to the first discussion group by applying the machine learning model; and
provide a second electronic invitation to a second user to join the second discussion group associated with the topic, wherein the second user was assigned to the second discussion group by applying the machine learning model.

2. The system of claim 1, wherein the hardware processor is further configured to modify the machine learning model based at least in part by monitoring message frequency within each of the plurality of discussion groups.

3. The system of claim 1, wherein the machine learning model is further configured to assign the first user and a third user to the first discussion group based at least in part on a determination that the first user and the third user each have at least one of a similar interest, similar demographic information, or similar purchase history information.

4. The system of claim 1, wherein the expected average user engagement level for an individual discussion group is determined based at least in part on an expected average number of messages posted to the individual discussion group per user assigned to the individual discussion group.

5. The system of claim 1, wherein the hardware processor is further configured to train the machine learning model based on an analysis of messages exchanged within a second plurality of discussion groups and discussion profiles of users that participated in the second plurality of discussion groups.

6. A computer-implemented method, comprising:
as implemented by one or more computing devices configured with specific executable instructions,
identifying a plurality of users to be assigned to discussion groups;
determining behavioral data associated with individual users of the plurality of users, wherein the behavioral data is determined based at least in part on at least one of retrieved user browsing history or user purchase history;
retrieving textual content previously submitted by individual users of the plurality of users, wherein the previously submitted textual content includes textual content submitted in at least one of a prior comment, message or review;
generating discussion profiles for the individual users based at least in part on the behavioral data and an analysis of the textual content previously submitted;
assigning each of the plurality of users to one of a plurality of discussion groups based at least in part on an expected average user engagement level of each of the plurality of discussion groups, wherein the expected average user engagement level is determined based at least in part on the discussion profiles and prior user engagement levels in one or more of a second plurality of discussion groups, wherein the second plurality of discussion groups is different than the plurality of discussion groups; and
generating a user interface that includes a selectable option to submit a message within one of the plurality of discussion groups.

7. The computer-implemented method of claim 6, wherein how many users are assigned to each of the plurality of discussion groups is determined based at least in part on a target group size.

8. The computer-implemented method of claim 7, wherein the target group size is defined as a range.

9. The computer-implemented method of claim 7, wherein the target group size is determined based at least in part by identifying that at least one existing discussion group having the target group size includes a higher message frequency than a different existing discussion group having a size that is different than the target group size.

10. The computer-implemented method of claim 6, wherein each of the plurality of users is assigned to one of the plurality of discussion groups using a machine learning model that is provided with the discussion profiles as input.

11. The computer-implemented method of claim 10, wherein the machine learning model is configured to apply an unsupervised learning approach.

12. The computer-implemented method of claim 6, wherein the machine learning model is configured to apply a supervised learning approach.

13. The computer-implemented method of claim 6, wherein the analysis of the textual content previously submitted comprises determining a vocabulary level of the content.

14. The computer-implemented method of claim 6, wherein the expected average user engagement level for an individual discussion group is determined based at least in part on at least one of a response latency within the individual discussion group, or a total number of messages within the individual discussion group.

15. The computer-implemented method of claim 14, further comprising determining the response latency within the individual discussion group based at least in part by identifying that a second message within the individual discussion group is responsive to a first message within the individual discussion group based on an analysis of content of the first message and content of the second message.

16. The computer-implemented method of claim 6, further comprising performing the analysis of the textual content previously submitted based at least in part on semantic parsing, metadata parsing, or a semantic index.

17. A system comprising:
an electronic data store; and
a hardware processor in communication with the electronic data store, the hardware processor configured to execute computer-executable instructions to at least:
   determine behavioral data associated with a user, wherein the behavioral data is determined based at least in part on at least one of browsing history of the user or purchase history of the user;
   analyze language within textual content previously submitted by the user to determine a language style associated with the user, wherein the previously submitted textual content includes textual content submitted in at least one of a prior comment, message or review;
   retrieve information associated with each of a plurality of discussion groups, wherein the information associated with each individual discussion group includes message content and information identifying users participating in the individual discussion group;
   determine a recommended discussion group for the user from among the plurality of discussion groups, wherein the recommended discussion group is determined based at least in part by determining that (a) the language style associated with the user is similar to a language style used in message content of the recommended discussion group and (b) the behavioral data associated with the user is similar to behavioral data associated with at least one user participating in the individual discussion group; and
   provide an electronic notification that includes a selectable option to join the recommended discussion group.

18. The system of claim 17, wherein the plurality of discussion groups are subgroups that all relate to the same topic as each other.

19. The system of claim 17, wherein the recommended discussion group is determined based at least in part by determining that the user is more likely to engage in discussion within the recommended discussion group than in other discussion groups of the plurality of discussion groups.

20. The system of claim 17, wherein analyzing language within the textual content previously submitted by the user comprises performing at least one of semantic parsing, linguistic analysis or a semantic index.

* * * * *